US007349963B2

(12) United States Patent
Rhee et al.

(10) Patent No.: US 7,349,963 B2
(45) Date of Patent: Mar. 25, 2008

(54) SYSTEM FOR DSL MODEM TYPE IDENTIFICATION

(75) Inventors: Wonjong Rhee, San Francisco, CA (US); Chiang-yu Chen, Stanford, CA (US); Iker Almandoz, Palo Alto, CA (US)

(73) Assignee: Adaptive Spectrum and Signal Alignment, Inc., Redwood City, CA (US)

( * ) Notice: Subject to any disclaimer, the term of this patent is extended or adjusted under 35 U.S.C. 154(b) by 282 days.

(21) Appl. No.: 10/981,068

(22) Filed: Nov. 4, 2004

(65) Prior Publication Data

US 2006/0095565 A1 May 4, 2006

(51) Int. Cl.
*G06F 15/173* (2006.01)
(52) U.S. Cl. ...................................... 709/224
(58) Field of Classification Search ................. 709/224
See application file for complete search history.

(56) References Cited

U.S. PATENT DOCUMENTS

| 5,491,720 | A | * | 2/1996 | Davis et al. ................. 375/222 |
| 5,889,470 | A | * | 3/1999 | Kaycee et al. .............. 370/465 |
| 6,012,056 | A | * | 1/2000 | Menlove ........................ 707/5 |
| 6,417,672 | B1 | | 7/2002 | Chong |
| 6,701,379 | B1 | * | 3/2004 | Urquizo et al. ............. 709/250 |
| 6,914,933 | B1 | * | 7/2005 | Gonikberg ................... 375/222 |
| 6,967,996 | B1 | | 11/2005 | Cai et al. |
| 2005/0033826 | A1 | | 2/2005 | Jones et al. |
| 2005/0123027 | A1 | | 6/2005 | Cioffi et al. |

OTHER PUBLICATIONS

Coffi, John M. and Mehdi Mohseni, Apr. 2004, "Dynamic Spectrum Management", Telektronikk Apr. 2004, p. 126-137.*
"PCT International Search Report", *International Applications No. PCT/IB2005/003468*, mailed Feb. 14, 2006., (Feb. 14, 2006), 4 pages.
"Written Opinion of the International Searching Authority", *International Applications No. PCT/IB2005/003468*, Report Issued May 8, 2007. (May 8, 2007), 7 pages.

* cited by examiner

*Primary Examiner*—Andrew Caldwell
*Assistant Examiner*—Christopher Biagini
(74) *Attorney, Agent, or Firm*—Blakely Sokoloff Taylor & Zafman

(57) ABSTRACT

Operational data collected from a communication system, such as a DSL system, may include exclusionary data and/or indicative data that can be analyzed to determine the type of communication device, such as a DSL modem, that generated the operational data. Exclusionary data, if any, can be used to exclude one or more communication device types from consideration. Indicative data, if any, may be used to influence the selection of a communication device type, such as by assigning scores to communication device type features and/or to communication device types. Information pertaining to various communication devices may be maintained in a database or the like. In a DSL system, modem types may be evaluated and selected by a modem identification unit or identifier that collects and analyzes the operational data using collecting means and identifying means. The identifier may be part of a controller, such as a DSM Center or the like implemented in and/or with a computer and coupled to the DSL system. Information such as a modem type selection then can be used by the controller to generate modem and/or system operation signals to assist in operation of the DSL system.

26 Claims, 7 Drawing Sheets

|  | Pilot tone | Power back-off | Downstream attenuation stability |
|---|---|---|---|
| Profile needed to obtain sufficient information | Profile with high data rate | Profile with low data rate | A set of profiles with different carrier masks |
| Efficient 5360 | Tone 60-100, 2 bits | Yes | Not stable |
| Efficient 5100a | Tone 64, 0 bit | No | Not stable |
| Efficient 5100b | Tone 64, 0 bit | Yes | Stable |
| 2Wire 1000SW | Tone 64, 0 bit | No | Stable |
| 2Wire 1800H | No Pilot | Yes | Stable |
| Alcatel SpeedTouch | Tone 60-100, 2 bits | Yes | Not stable |

|  | Downstream transmit power | Sharpness of downstream bit distribution rising edge | Downstream attenuation with respect to upstream attenuation |
|---|---|---|---|
| Profile needed to obtain sufficient information | Profiles with no power back-off needed | Profiles with high data rate and no carrier mask | All available profiles |
| Efficient 5360 | Negative | Smooth | Large |
| Efficient 5100a | Close to zero | Smooth | Large |
| Efficient 5100b | Close to zero | Sharp | Large |
| 2Wire 1000SW | Negative | Smooth | Small |
| 2Wire 1800HW | Positive | Smooth | Large |
| Alcatel SpeedTouch | Positive | Smooth | Large |

Table 1

| Score | Confidence Level |
|---|---|
| > 80 | Very High |
| 70 ~ 80 | High |
| 60 ~ 70 | Moderate |
| 50 ~ 60 | Low |
| < 50 | Unlikely |

Table 2

Figure 5

SYSTEM FOR DSL MODEM TYPE IDENTIFICATION

CROSS-REFERENCE TO RELATED APPLICATIONS

This application is related to U.S. Ser. No. 10/817,128, entitled "DSL SYSTEM ESTIMATION AND PARAMETER RECOMMENDATION" and filed Apr. 2, 2004, the disclosure of which is incorporated herein by reference in its entirety for all purposes.

STATEMENT REGARDING FEDERALLY SPONSORED RESEARCH OR DEVELOPMENT

Not applicable.

REFERENCE TO SEQUENCE LISTING, A TABLE, OR A COMPUTER PROGRAM LISTING COMPACT DISK APPENDIX

Not applicable.

BACKGROUND OF THE INVENTION

1. Field of the Invention

This invention relates generally to methods, systems and apparatus for managing digital communications systems. More specifically, this invention relates to identifying types of modems or other communication devices, such as by manufacturer, model number, and software version, used in a communication system such as an ADSL system.

2. Description of Related Art

Digital subscriber line (DSL) technologies provide potentially large bandwidth for digital communication over existing telephone subscriber lines (referred to as loops and/or the copper plant). Telephone subscriber lines can provide this bandwidth despite their original design for only voiceband analog communication. In particular, asymmetric DSL (ADSL) can adjust to the characteristics of the subscriber line by using a discrete multitone (DMT) line code that assigns a number of bits to each tone (or sub-carrier), which can be adjusted to channel conditions as determined during training and initialization of the modems (typically transceivers that function as both transmitters and receivers) at each end of the subscriber line.

In recent years, various DSL modems from a variety of manufacturers and vendors have been deployed to customers in a variety of DSL and other communication networks. While some customers are using the latest and/or popular types of modems, other customers may be using very old and/or less common types of modems. Very little effort is made to track the implementation, use and changes to modem type used by customers, meaning that operators and/or other parties have little information about what those customers are using on their respective networks. Generally, an "operator" is a telecom or other service provider who operates the network and provides the service itself. Standardized mechanisms within the existing deployed base of modems that supposedly allow the modems to identify their vendor ID, version ID, and serial number have not been implemented, or have been implemented incorrectly, and are thus ineffective for identification of modems.

Current techniques for acquiring such customer/modem type information are costly and generally ineffective. They may include making a special effort to contact customers directly to collect such information, which is time consuming, highly inefficient and very costly. Operators and others also may collect information whenever there is a "truck roll" (that is, a service call to the customer's premises for repair and/or maintenance work). However, operators and the like attempt to keep the number of truck rolls to a minimum and this is a very inefficient way to collect information about customers and the types of modems they are using.

Systems, methods and techniques that permit identification of modems, modem types and software version used by customers in communication systems such as DSL systems would represent a significant advancement in the art. In particular, identification of modem types using readily available data and/or other information in the communication system would represent a considerable advancement in the field of DSL service rates and associated ranges.

BRIEF SUMMARY OF THE INVENTION

The present invention provides methods, apparatus, products, techniques and systems for identifying a communication device type in a communication system. The communication device may be a modem in a DSL system and the like. The identification of the device type is based on collected and analyzed operational data.

Operational data is collected from the communication system, for example being collected from a network management system coupled to the communication system, a management entity coupled to the communication system; or a management information base coupled to the communication system. The operational data may include exclusionary data and/or indicative data, depending on the types of data available from the communication system. In a DSL system, the types of data available may be defined by, for example, an applicable standard.

The collected operational data is analyzed to determine, if possible and/or appropriate, the type of communication device that generated the operational data. Exclusionary data, if any, can be used to exclude one or more communication device types from consideration. Indicative data, if any, may be used to influence the selection of a communication device type. In some embodiments of the present invention, the indicative data is used to assign scores to communication device type features and/or to communication device types. Information pertaining to various communication devices may be maintained in a database or the like.

In a DSL system, modem types may be evaluated and selected by a modem identification unit or identifier that collects and analyzes the operational data using collecting means and identifying means. The identifier may be part of a controller coupled to the DSL system. In some embodiments, the controller is a DSM Center or the like, implemented in and/or with a computer. Information such as a modem type selection then can be used by the controller to generate modem and/or system operation signals to assist in operation of the DSL system.

Further details and advantages of the invention are provided in the following Detailed Description and the associated Figures.

BRIEF DESCRIPTION OF THE SEVERAL VIEWS OF THE DRAWING

The present invention will be readily understood by the following detailed description in conjunction with the accompanying drawings, wherein like reference numerals designate like structural elements, and in which:

FIG. 5 are tables showing evaluation of modem types under consideration according to one embodiment of the present invention.

DETAILED DESCRIPTION OF THE INVENTION

Figure 1:
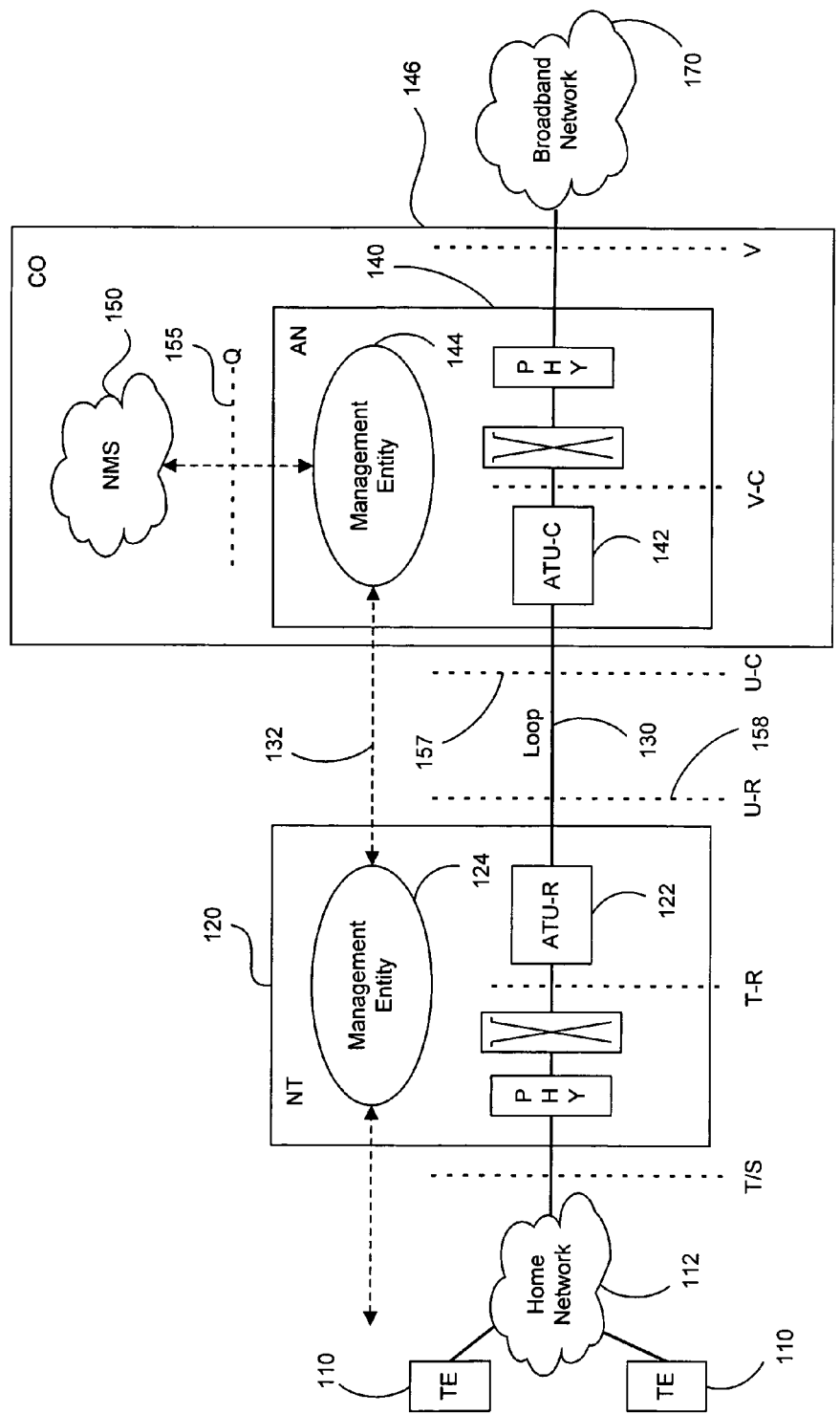
FIG. 1 is a schematic block reference model system according to the G.997.1 standard.

The following detailed description of the invention will refer to one or more embodiments of the invention, but is not limited to such embodiments. Rather, the detailed description is intended only to be illustrative. Those skilled in the art will readily appreciate that the detailed description given herein with respect to the Figures is provided for explanatory purposes as the invention extends beyond these limited embodiments.

Embodiments of the present invention can be used to identify one or more communication device types (for example, modem types) in communication systems such as DSL systems. A modem or other communication device "type" as described herein may be a identification and/or other designation of the modem or other device using one or more qualifiers/descriptors. Examples of such qualifiers/descriptors can include (though are not limited to) manufacturer, model number, software version, etc., as will be appreciated by those skilled in the art. A controller or other entity may have a set of device types from which to select, where the set of device types contains relevant information about the device types (again, for example, manufacturer(s), model number(s), software version(s), etc.).

Different modems have different characteristics, for example internal noise levels that can affect maximum attainable data rates. Thus, identifying the type of modem can be an important asset in improving network. Embodiments of the present invention use the collection and analysis of various operational data relating to the modem's operation. Identification of the modem is then based on this analysis. In some embodiments of the present invention, two classes of data are used—exclusionary data (which relates to operational and performance rules for various modem types that allow the exclusion from consideration of any modem type not meeting one of these rules) and indicative data (which includes important information about the modem type, but with which no modem may be excluded with certainty). In some embodiments, these two classes of data are distinct, while in other embodiments these data designations merely reflect a difference in the reliability and certainty with which the data can be used to include or exclude a given modem type from consideration. In some cases where these data are used, a score or other measure of relative likelihood can be used to rate each modem type's likely implementation and the weight or confidence to be accorded each type of operational data considered.

Specific examples of operational data (such as modem features and parameters) will be utilized in examples presented herein to assist in illustrating and explaining the present invention. However, as will be appreciated by those skilled in the art, these are examples only and the invention extends beyond these specific embodiments. For example, operational data collected from the system can include performance-characterizing operational data that typically is available in an ADSL system via element-management-system protocols. Moreover, a DSL system on which DSL modems operate may be used to illustrate operation of one or more embodiments of the present invention as well. Again, while some specific modem types are discussed below, these examples, too, are not limiting in any way.

An identifier and/or controller (for example, a dynamic spectrum manager or other independent entity) can perform the methods and implement the present invention in various ways. As discussed in more detail below, this controller can be implemented using different apparatus and in different ways, as will be appreciated by those skilled in the art. Therefore, the present invention is not limited solely to the embodiments illustrated in the drawings and/or preferred embodiments provided herein.

As described in more detail below, an identifier implementing one or more embodiments of the present invention can be part of a controller (for example, a dynamic spectrum manager or spectrum management center). The controller and/or identifier can be located anywhere. In some embodiments, the controller and/or identifier reside in the DSL CO, while in other cases they may be operated by a third party located outside the CO. The structure, programming and other specific features of a controller and/or identifier usable in connection with embodiments of the present invention will be apparent to those skilled in the art after reviewing the present disclosure.

A controller, such as a dynamic spectrum management center (DSM Center), a "smart" modem and/or computer system can be used to collect and analyze the operational data as described in connection with the various embodiments of the present invention. The controller and/or other components can be a computer-implemented device or combination of devices. In some embodiments, the controller is in a location remote from the modems. In other cases, the controller may be collocated with one of or both of the modems as equipment directly connected to a modem, DSLAM or other communication system device, thus creating a "smart" modem. The phrases "coupled to" and "connected to" and the like are used herein to describe a connection between two elements and/or components and are intended to mean coupled either directly together, or indirectly, for example via one or more intervening elements or via a wireless connection, where appropriate.

The following examples of embodiments of the present invention will use ADSL systems as exemplary communications systems. Within these ADSL systems, certain conventions, rules, protocols, etc. may be used to describe operation of the exemplary ADSL system and the information and/or data available from customers (also referred to as "users") and/or equipment on the system. However, as will be appreciated by those skilled in the art, embodiments of the present invention may be applied to various communications systems, and the invention is not limited to any particular system. The present invention can be used in any data transmission system for which knowledge of the system's modems and/or other identifiable communication devices would be valuable.

Various network management elements are used for management of ADSL physical-layer resources, where elements refer to parameters or functions within an ADSL modem pair, either collectively or at an individual end. A network management framework consists of one or more managed nodes, each containing an agent. The managed node could be a router, bridge, switch, ADSL modem or other. At least one NMS (Network Management System), which is often called the manager, monitors and controls managed nodes and is usually based on a common PC or other computer. A network management protocol is used by the manager and agents to exchange management information and data. The unit of management information is an object. A collection of related objects is defined as a Management Information Base (MIB).

FIG. 1 shows the reference model system according to the G.997.1 standard (G.ploam), which is incorporated herein in its entirety by reference for all purposes, and in which embodiments of the present invention can be implemented. This model applies to all ADSL systems meeting the various standards that may or may not include splitters, such as ADSL1 (G.992.1), ADSL-Lite (G.992.2), ADSL2 (G.992.3), ADSL2-Lite G.992.4, ADSL2+ (G.992.5) and the G.993.x emerging VDSL standards, as well as the G.991.1 and G.991.2 SHDSL standards, all with and without bonding. This model is well known to those skilled in the art.

The G.997.1 standard specifies the physical layer management for ADSL transmission systems based on the clear embedded operation channel (EOC) defined in G.997.1 and use of indicator bits and EOC messages defined in G.992.x standards. Moreover, G.997.1 specifies network management elements content for configuration, fault and performance management. In performing these functions, the system utilizes a variety of operational data that are available at and can be collected from an access node (AN).

In FIG. 1, customers' terminal equipment 110 is coupled to a home network 112, which in turn is coupled to a network termination unit (NT) 120. In the case of an ADSL system, NT 120 includes an ATU-R 122 (for example, also referred to as a transceiver in some cases, defined by one of the ADSL standards) or any other suitable network termination modem, transceiver or other communication unit. Each modem can be identified, for example, by manufacturer and model number. As will be appreciated by those skilled in the art and as described herein, each modem interacts with the communication system to which it is connected and may generate operational data as a result of the modem's performance in the communication system.

NT 120 also includes a management entity (ME) 124. ME 124 can be any suitable hardware device, such as a microprocessor, microcontroller, or circuit state machine in firmware or hardware, capable of performing as required by any applicable standards and/or other criteria. ME 124 collects and stores performance data in its MIB, which is a database of information maintained by each ME, and which can be accessed via network management protocols such as SNMP (Simple Network Management Protocol), an administration protocol used to gather information from a network device to provide to an administrator console/program or via TL1 commands, TL1 being a long-established command language used to program responses and commands between telecommunication network elements.

Each ATU-R in a system is coupled to an ATU-C in a CO or other central location. In FIG. 1, ATU-C 142 is located at an access node (AN) 140 in a CO 146. An ME 144 likewise maintains an MIB of performance data pertaining to ATU-C 142. The AN 140 may be coupled to a broadband network 170 or other network, as will be appreciated by those skilled in the art. ATU-R 122 and ATU-C 142 are coupled together by a loop 130, which in the case of ADSL typically is a telephone twisted pair that also carries other communication services.

Several of the interfaces shown in FIG. 1 can be used for determining and collecting performance data. The Q-interface 155 provides the interface between the NMS 150 of the operator and ME 144 in AN 140. All of the parameters specified in the G.997.1 standard apply at the Q-interface 155. The near-end parameters supported in ME 144 are derived from ATU-C 142, while the far-end parameters from ATU-R 122 can be derived by either of two interfaces over the U-interface. Indicator bits and EOC messages, which are sent using embedded channel 132 and are provided at the PMD layer, can be used to generate the required ATU-R 122 parameters in ME 144. Alternately, the OAM (Operations, Administrations and Management) channel and a suitable protocol can be used to retrieve the parameters from ATU-R 122 when requested by ME 144. Similarly, the far-end parameters from ATU-C 142 can be derived by either of two interfaces over the U-interface. Indicator bits and EOC messages, which are provided at the PMD layer, can be used to generate the required ATU-C 142 parameters in ME 122 of NT 120. Alternately, the OAM channel and a suitable protocol can be used to retrieve the parameters from ATU-C 142 when requested by ME 124.

At the U-interface (which is essentially loop 130), there are two management interfaces, one at ATU-C 142 (the U-C interface 157) and one at ATU-R 122 (the U-R interface 158). Interface 157 provides ATU-C near-end parameters for ATU-R 122 to retrieve over the U-interface 130. Similarly, interface 158 provides ATU-R near-end parameters for ATU-C 142 to retrieve over the U-interface 130. The parameters that apply may be dependent upon the transceiver standard being used (for example, G.992.1 or G.992.2).

The G.997.1 standard specifies an optional OAM communication channel across the U-interface. If this channel is implemented, ATU-C and ATU-R pairs may use it for transporting physical layer OAM messages. Thus, the transceivers 122, 142 of such a system share various operational and performance data maintained in their respective MIBs.

More information can be found regarding ADSL NMSs in DSL ForumTechnical Report TR-005, entitled "ADSL Network Element Management" from the ADSL Forum, dated March 1998, which is incorporated herein by reference in its entirety for all purposes. Also, DSL Forum Working Text WT-87 (Rev. 6), entitled "CPE WAN Management Protocol" from the DSL Forum, dated January 2004 is incorporated herein by reference in its entirety for all purposes. Finally, DSL Forum Working Text WT-082v7, entitled "LAN-Side DSL CPE Configuration Specification" from the DSL Forum, dated Jan. 5, 2004 is incorporated herein by reference in its entirety for all purposes. These documents address different situations for CPE side management.

As will be appreciated by those skilled in the art, at least some of the operational data and/or parameters described in these documents can be used in connection with embodiments of the present invention. Moreover, at least some of the system descriptions are likewise applicable to embodiments of the present invention. Various types of operational data and/or information available from an ADSL NMS can be found therein; others may be known to those skilled in the art.

In a typical topology of a DSL plant, in which a number of transceiver pairs are operating and/or available, part of each subscriber loop is collocated with the loops of other users within a multi-pair binder (or bundle). After the pedestal, very close to the Customer Premises Equipment (CPE), the loop takes the form of a drop wire and exits the bundle. Therefore, the subscriber loop traverses two different environments. Part of the loop may be located inside a binder, where the loop is sometimes shielded from external electromagnetic interference, but is subject to crosstalk. After the pedestal, the drop wire is often unaffected by crosstalk due to its being far from other pairs for most of the drop, but transmission can also be more significantly impaired by electromagnetic interference because the drop wires are unshielded. Many drops have 2 to 8 twisted-pairs within them and in situations of multiple services to a home or bonding (multiplexing and demultiplexing of a single service) of those lines, additional substantial crosstalk can occur between these lines in the drop segment.

Figure 2:
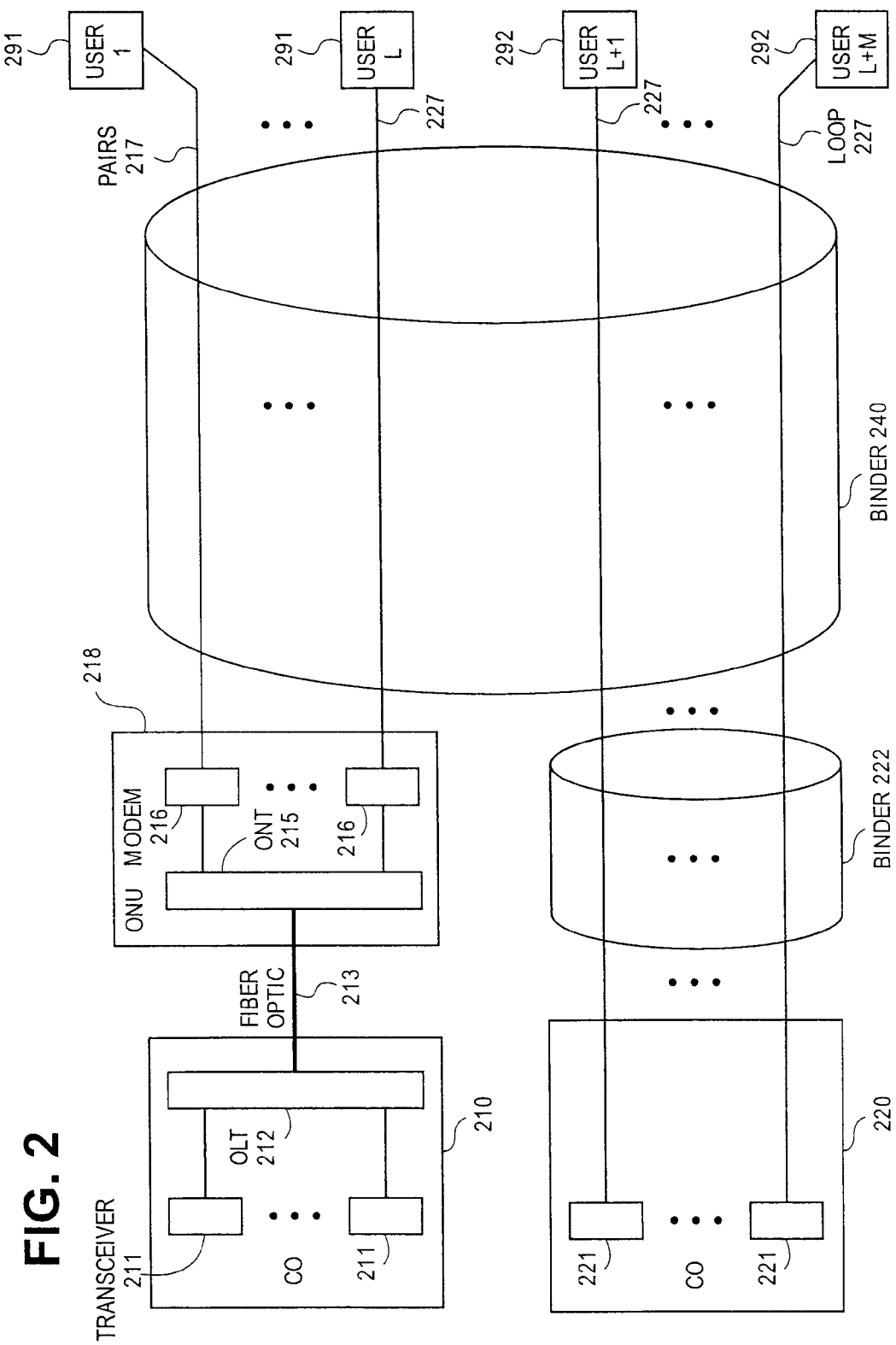
FIG. 2 is a schematic block diagram illustrating a generic, exemplary DSL deployment.

A generic, exemplary DSL deployment scenario is shown in FIG. 2. All the subscriber loops of a total of (L+M) users 291, 292 pass through at least one common binder. Each user is connected to a Central Office (CO) 210, 220 through a dedicated line. However, each subscriber loop may be passing through different environments and mediums. In FIG. 2, L customers or users 291 are connected to CO 210 using a combination of optical fiber 213 and twisted copper pairs 217, which is commonly referred to as Fiber to the Cabinet (FTTCab) or Fiber to the Curb. Signals from transceivers 211 in CO 210 have their signals converted by optical line terminal 212 and optical network terminal 215 in CO 210 and optical network unit (ONU) 218. Modems 216 in ONU 218 act as transceivers for signals between the ONU 218 and users 291.

The loops 227 of the remaining M users 292 are copper twisted pairs only, a scenario referred to as Fiber to the Exchange (FTTEx). Whenever possible and economically feasible, FTTCab is preferable to FTTEx, since this reduces the length of the copper part of the subscriber loop, and consequently increases the achievable rates. The existence of FTTCab loops can create problems to FTTEx loops. Moreover, FTTCab is expected to become an increasingly popular topology in the future. This type of topology can lead to substantial crosstalk interference and may mean that the lines of the various users have different data carrying and performance capabilities due to the specific environment in which they operate. The topology can be such that fiber-fed "cabinet" lines and exchange lines can be mixed in the same binder.

As can be seen in FIG. 2, the lines from CO 220 to users 292 share binder 222, which is not used by the lines between CO 210 and users 291. Moreover, another binder 240 is common to all of the lines to/from CO 210 and CO 220 and their respective users 291, 292.

Figure 3:
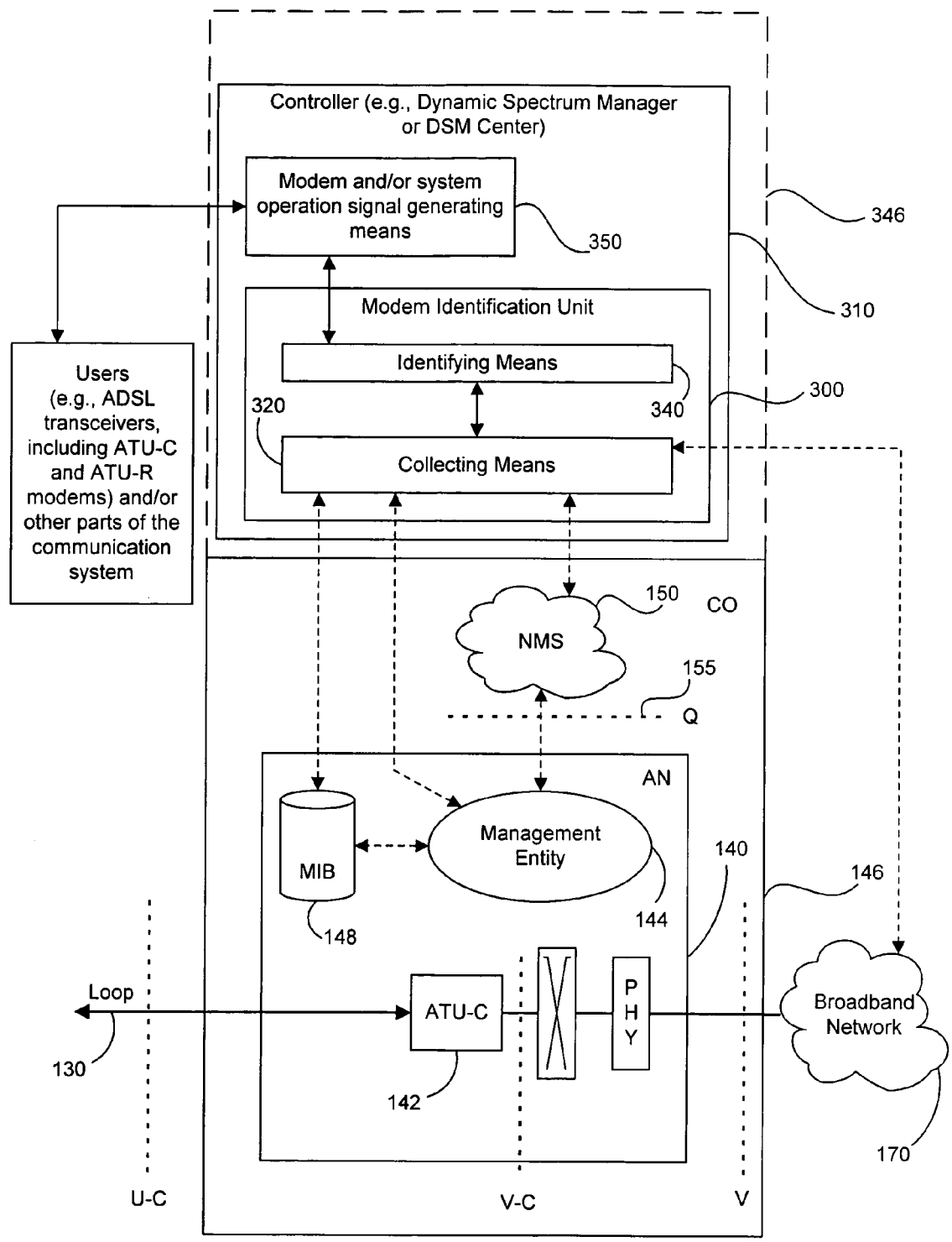
FIG. 3 is a schematic block diagram of one embodiment of the present invention in a DSL system.

According to one embodiment of the present invention shown in FIG. 3, a modem identification unit 300 may be part of an independent entity coupled to a DSL system, such as a controller 310 (for example, DSM Center or a dynamic spectrum manager) assisting users and/or one or more system operators or providers in optimizing their use of the system. Such a dynamic spectrum manager can benefit greatly from knowing information about the types of modems being used in the system. (A dynamic spectrum manager may also be referred to as a Dynamic Spectrum Management Center, DSM Center, System Maintenance Center or SMC.) In some embodiments, the controller 310 may be an ILEC or CLEC operating a number of DSL lines from a CO or other location. As seen from the dashed line 346 in FIG. 3, controller 310 may be in the CO 146 or may be external and independent of CO 146 and any company operating within the system. Moreover, controller 310 may be coupled to and/or controlling multiple COs.

The modem identification unit 300 includes collecting means 320 and identifying means 340. As seen in FIG. 3, the collecting means 320 may be coupled to NMS 150, ME 144 at AN 140 and/or the MIB 148 maintained by ME 144. Data also may be collected through the broadband network 170 (for example, via the TCP/IP protocol or other means outside the normal internal data communication within a given DSL system). One or more of these connections allows the modem identification unit to collect operational data from the system. Data may be collected once or over time. In some cases, the collecting means 320 will collect on a periodic basis, though it also can collect data on-demand or any other non-periodic basis, thus allowing the modem identification unit 300 to update its system configuration approximation, if desired. Data collected by means 320 is transmitted to identifying means 340 for analysis and any decision regarding identification of a modem type.

In the exemplary system of FIG. 3, the identifying means 340 is coupled to a modem and/or system operation signal generating means 350 in the controller 310. This signal generator 350 is configured to generate and send instruction signals to modems and/or other components of the communication system (for example, ADSL transceivers and/or other equipment, components, etc. in the system). These instructions may include acceptable data rates, transmit power levels, coding and latency requirements, etc. The instructions may be generated after the controller 310 determines what types of modems operate on the communication system. In some cases, for example, the instruction signals can assist in improving performance for one or more customers and/or operators using the system.

In some embodiments of the present invention, the modem identification unit 300 may be implemented in a computer such as a PC, workstation or the like. The collecting means 320 and identifying means 340 may be software modules, hardware modules or a combination of both, as will be appreciated by those skilled in the art. When working with a large numbers of modems, databases may be introduced and used to manage the volume of data collected.

Figure 4:
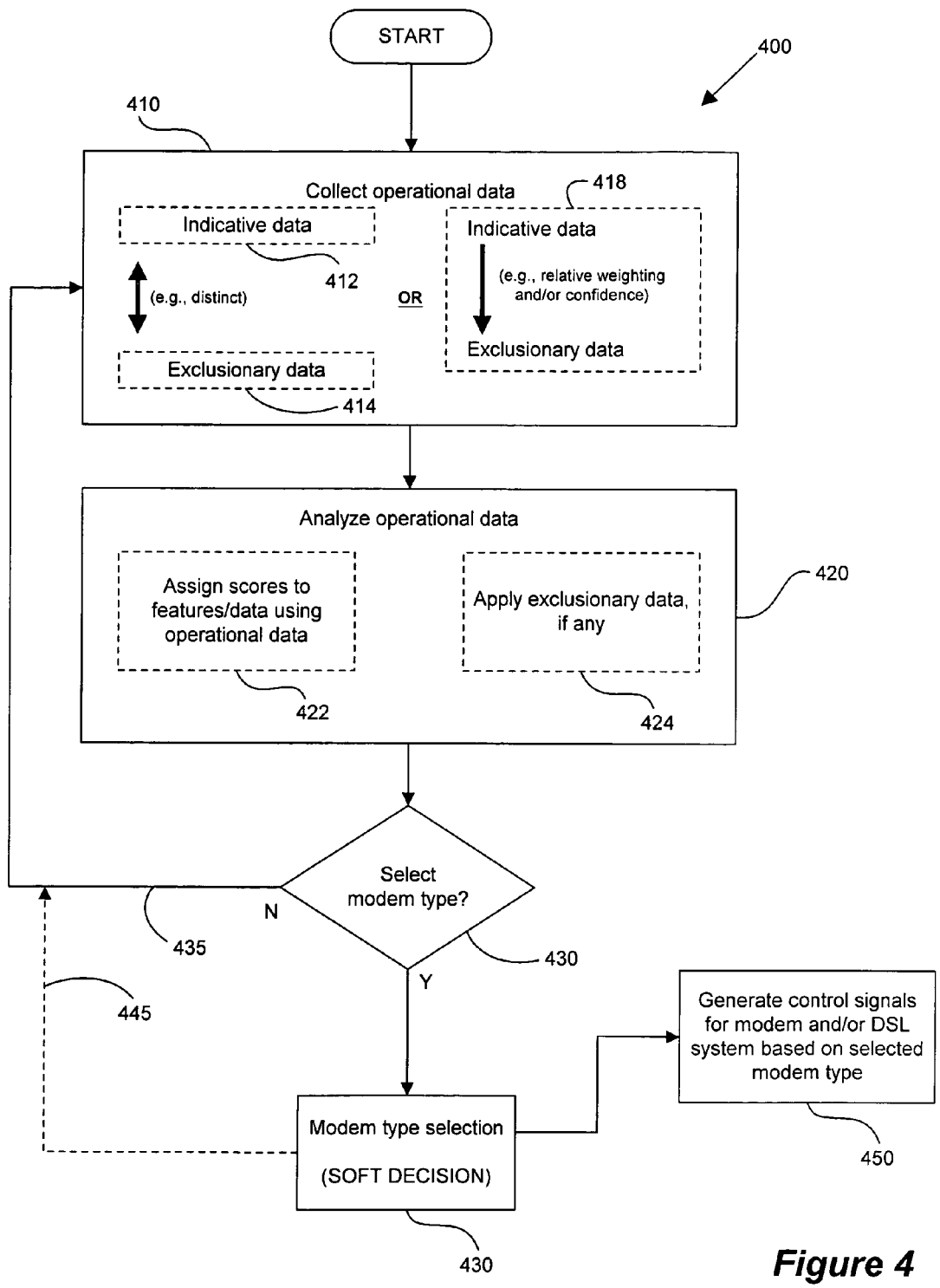
FIG. 4 is a flow diagram of methods according to one or more embodiments of the present invention.

One embodiment of the present invention is shown as method 400 in FIG. 4. The method can be performed by a controller, modem identifier, modem identification unit, dynamic spectrum manager, computer, hardware, software, a computer program product that comprises computer executable instructions that perform the method when executed by a computer, etc. After starting, operational data is collected at step 410. For example, a controller can collect such operational data from MIBs or other components in a DSL or other communication system. The data may be of the type described herein and/or any other data that would be helpful in identifying a modem type.

As noted in 410, the operational data collected may be separated or categorized into distinct classes or types of data 412, 413. For example, indicative data 412 may be collected, which is important information about modem operation, but which cannot be used independent of other information to verify and/or exclude a specific modem type. The indicative data might include (without limitation) data pertaining to at least one of the following features: stability of upstream and downstream attenuation; upstream and downstream transmit power compared to the number of used tones in upstream and downstream transmissions; sharpness of upstream and downstream bit distribution rising and falling edges; downstream attenuation with respect to upstream attenuation; the maximum number of bits loaded per tone; abnormal margin values; and/or differences between a current data rate and a maximum attainable data rate for both upstream and downstream transmissions.

The method 400 also may collect exclusionary data 414, which is data relating to absolute rules of modems and which can be used to verify and/or exclude a specific modem type. The exclusionary data might include (without limitation) data pertaining to at least one of the following features: pilot tone location; reported number of bits in the pilot tone; operation under medium-delay interleaved profiles; and/or power back-off. In other cases, the operational data 418 may not be completely separated into distinct classes, but instead treated as a continuum of data and/or feature types that differ as to the confidence with which they identify a modem type.

The collected operational data is then analyzed at 420. In some embodiments of the present invention, the analysis 420 may be performed in component steps (in whatever sequence is appropriate). In the example shown in FIG. 4, scores are assigned at 422 to each modem type for the various features for which information is provided by the collected operational data. These scores may be weighted, as necessary and/or appropriate to emphasize features and/or data that are more important or reflect a higher degree of confidence in identifying the modem type. At 424 the collected exclusionary data, if any, is used to further refine the identification of the modem's type.

In some cases, this application of the exclusionary data may be used to remove certain modem types from consideration. In other cases, these exclusionary data may be weighted in a manner that reflects a higher level of certainty in confirming and/or excluding modem types in the evaluation. Finally, any remaining candidates are evaluated at 430 to determine whether a modem type can be selected from the analyzed data and, if so, which modem type is most likely in use. Where no decision can be made, the process may go back at 435 to collect additional operational data to improve the chances of being able to make a credible selection. Even where a modem type selection is presented at 440, the process may repeat itself at 445 to improve its information and/or to make other selections based on new or improved operational data. The selected modem type can be used by a controller (such as a DSM Center) at 450 to generate control signals for the modem and/or DSL system (including, for example, other modems and/or system components).

A more specific example of one embodiment of the present invention is now provided. In this example, 6 common ADSL modems are considered:

three Siemens Efficient modems, types/models 5360, 5100a and 5100b;

two 2Wire modems, types/models 1000SW (using software version 3.3.2) and 1800HW; and one Alcatel SpeedTouch modem.

The use of these particular modems and these particular manufacturers does not imply any preference for or other bias for or against any specific equipment and/or producer of such equipment. These merely are common modems with which embodiments of the present invention are useful.

This exemplary method seeks to identify modems based on collected operational data. Diverse operational data can be collected by choosing various line profiles, where line profiles may be chosen and controlled by the operator and implemented via a DSLAM. A line profile specifies the list of restrictions imposed on the associated DSL line, such as restrictions regarding maximum/planned/minimum data rates, maximum power spectrum density, carrier mask, maximum-additional/target/minimum SNR margins (noise margins) and FEC (forward error correction) parameters.

Although it typically is impossible to extract all the different features for different ADSL modems from the information provided by the operational data, much can be learned and determined by carefully analyzing the operational data according to the present invention. Some of the different features that can be evaluated in this exemplary process are summarized in Table 1 of FIG. 5, and some are briefly explained below. Again, these are modem operation features that are reflected in the operational data collected using embodiments of the present invention.

Pilot tone location and reported number of bits in the pilot tone: In ADSL Standard G.992.1 Annex A, tone 64 (276 kHz) is reserved for a pilot signal that is used for synchronizing DMT symbols. However, not all modems follow this rule. Instead, 3 types of pilot tone "behavior" can be observed in the 6 modems under consideration in this example:

(1) Pilot tone at tone 64, reports 0 bits;

(2) Moving pilot tone between tone 60 and tone 100, reports 2 bits; and (3) No pilot tone.

The pilot tone can be seen easily from a modem's bit distribution, especially when the data rate is high. For example, when the downstream data rate is 6 Mbps, the number of bits loaded in low frequency tones usually is large and a tone with 0 or 2 bits usually stands out significantly in a bit distribution plot. By finding a tone possessing an uncharacteristic and/or sudden 0-bit or 2-bit count, the pilot tone location can be identified easily. When the data rate is low and thus only a small number of bits are loaded, it may be difficult to find the pilot tone. In such a case, the bit distribution can be repeatedly collected until a reliable decision is made.

When a modem does not follow one of the three rules above, it probably is not one of the 6 types considered here. For instance, a Netopia Cayman modem model 3220 is known to have a moving pilot tone between tones 60 and 100, while reporting 0 bit.

Power back-off: When the SNR margin is high, an ADSL modem can adjust gains to reduce the transmit power of the ATU-C to keep the SNR margin consistent with the maximum-additional/target/minimum SNR margins of the profile. In almost all service providers' default profiles, the target margin is 6 dB. Also, in most service providers' default profiles, the minimum margin is 0 dB and the maximum additional margin is 10 dB. Therefore, a reasonable margin range is from 0 dB to 16 dB, and a well-implemented modem should make its best effort to operate in the range by reducing transmit power of ATU-C whenever applicable. Some modems, however, fail to implement this function properly. Such malfunctioning power back-off can be detected whenever the margin is larger than the maximum allowed margin and the ATU-C is transmitting at maximum power. For example, in some modems, if there is no power reduction when the downstream SNR margin is 25 dB (that is, >16 dB), the modem's power back-off functionality can be judged to be malfunctioning.

If all of the collected data have an SNR margin below 16 dB (MAXSNRM in general), then it is not possible to detect a nonworking power back-off functionality. In such a case, a profile with a sufficiently low data rate (margin is increased by decreasing data rate) and/or sufficiently low additional margin (normal modems need to implement power back-off as soon as margin is above the sum of the target margin plus any permitted additional margin) can be used to test the power back-off functionality.

Operation under medium-delay interleaving profile: Some modems malfunction when medium-delay profiles are being used. Such modems can be detected directly by using a medium-delay profile and checking the operation status of the modem under consideration.

Stability of downstream attenuation: According to ADSL1 standard (G.992.1), a DSL modem needs to calculate and report LATN (Line Attenuation—average channel attenuation of downstream bandwidth) during training and SATN (Signal Attenuation—average attenuation of bit-loaded downstream bandwidth) during operation. In some modems, however, the calculation of downstream attenuation might not follow the standard, especially when profiles with distinct carrier masks are used. Moreover, the calculated attenuation might not be constant when a single profile is used repeatedly to collect the data. Therefore, it is often difficult to judge if a modem is reporting LATN or SATN during operation, but the stability of the attenuation value for a single profile or distinct profiles can be used for modem identification.

Downstream transmit power: When a normal profile is used and SNR margin is in a reasonable region (for example, 0~16 dB if the MAXSNRM is 16 dB), no power back-off is needed and the PSD (Power Spectrum Density) level of the loaded tones is usually close to the maximum PSD that is allowed by the profile in use (usually −40 dBm/Hz). In such a situation, the downstream transmit power is usually close to the maximum PSD multiplied by the size of the loaded bandwidth (in Hz). The transmit power, however, is somewhat larger than the calculated value for some modems while it is somewhat smaller for other modems. This information provides another characteristic that can be used to assist in distinguishing modem types. Furthermore, when a special profile with a very restrictive carrier mask and very low data rate is used, some modems tend to use a fixed amount of transmit power regardless of margin or data rate. This also can be used to assist with modem identification.

Sharpness of downstream bit distribution rising edge: When high-data rate profiles are used, allowing use of all of the downstream tones, non-zero bits can be loaded from the first permitted tone. In most of the modems, however, the upstream power leaks to the downstream transmission band, typically making the first few downstream tones noisy. As a result, the numbers of bits loaded near the first permitted tone are relatively small. As the frequency increases (and upstream leakage to the downstream transmission band decreases), the number of bits in each tone increases gradually and reaches a steady value. The sharpness of this rising edge varies from modem to modem, depending on the design of upstream transmit filters or echo-cancellers. Thus this rising edge can be used as a feature for modem identification.

Downstream attenuation with respect to upstream attenuation: In some modems, offsets exist for the calculation of downstream attenuations, and thus the ratio between downstream attenuation and upstream attenuation can vary significantly for different modem types. Of the six modems considered in this example, the 2Wire 1000SW has a large ratio between downstream attenuation and upstream attenuation. This phenomenon can be observed in all profiles.

Bit distribution: Some modems adopt special bit loading algorithms. As a result, the bit distribution during operation may differ from a theoretically optimal bit distribution or other expected bit distribution. For example, a modem might load only up to 9 bits in any tone (compared, for example, to a standard that allows up to 15 bits per tone), a modem might load slightly fewer bits in a particular tone than expected, or a modem might prefer some tones over other tones. It may be possible to observe such behaviors by comparing bit distributions that correspond to various profiles (for example, profiles with high or low data rates, high or low target margins, small or large numbers of suppressed tones resulting, for example, from restrictive or less restrictive carrier masks), etc.).

Margin values: Some modems report abnormal margin values when profiles with very low data rate or severe carrier mask restriction are used. This characteristic can be used for modem identification.

Comparison of current data rate and maximum attainable data rate: By choosing a high data rate profile, the modem can be forced to operate at the maximum data rate that the line permits. In such situations, some modems report exactly the same data rate for both current data rate and maximum attainable data rate while some other modems report slightly different values. This characteristic can also be used for modem identification.

As will be appreciated by those skilled in the art, a number of different operational data can be used to evaluate modem features. Some of these operational data types can include one or more of the following (without limitation): upstream and downstream bit distributions; upstream and downstream transmit power; upstream and downstream SNR margins; upstream and downstream current data rates; upstream and downstream maximum attainable data rates; upstream and downstream relative capacities; upstream and downstream attenuations; upstream and downstream ATM cell counts; profile information; upstream and downstream CV (Code Violation) counts; upstream and downstream FEC (Forward Error Correction) counts; LOS (Loss Of Signal) counts; upstream and downstream ES (Errored Seconds); or upstream and downstream SES (Severely Errored Seconds).

Based on the above information extracted from spectrum scanning operational data, certain decisions can be made regarding the type of modem operating in the ADSL system. Instead of making one assertive decision, the output of this program may be a soft decision, as noted above and shown in FIG. 4.

When a set of operational data is acquired using this example, a features list such as the one shown in FIG. 5 can be utilized and examined. The features of this example may be divided into two groups—exclusionary data and indicative data. The exclusionary data contains pilot tone information, the function of power back-off and the operation under medium-delay profiles. These three features (in this example) are absolute rules of the modems, and thus some candidate modems can be removed from consideration based on such rules.

The indicative data of this example contains all of the other features. These features can provide important information about the modem, but (in this example) no modem candidates can be excluded based on these features. Thus, scores (or probabilities) can be assigned by examining each feature in this group. The aggregate score(s) can be compared to a scale of scores, such as the exemplary one found in Table 2 of FIG. 5.

Again, the features of this example can be separated into two groups. When a pilot tone is confidently detected at tone 64 and 0 bits are reported, the modem cannot be an Efficient 5360, 2Wire 1800HW or Alcatel SpeedTouch. However, if the downstream attenuation with respect to upstream attenuation is small, all that can be concluded is that it is more likely that this modem is a 2Wire 1000SW. It is imprudent to exclude the other five modems because the downstream attenuation with respect to upstream attenuation is sometimes small for other modems, too. Therefore, the scores of the more plausible modems can be raised based on this feature, expecting the correct modem to be found by the sum of the scores.

Based on the procedures and considerations discussed above, the modem can be identified using the following steps. First, the scores for each feature relating to the indicative data are assigned to each modem under consideration. The weights of the scores are determined according to the importance of the feature to the modem. The features relating to exclusionary data can then be applied to identify possible candidates. The final scores for the six modems are calculated/determined and are served as the soft output of the process. The exact rules for weighting and scoring can be determined by those skilled in the art depending upon the modems under consideration and the types of data available for evaluation.

Finally, confidence levels can be given based on the scores, one example of which is illustrated in FIG. 5. The soft output suggests the modem in use is the type with highest score. This type of evaluation also allows a comparison to be made among the modems under consideration to view and evaluate the similarities and differences between the various modem types. In most cases, when the highest score of all modems considered is significantly higher than the second highest score, a confident decision can be made about the modem type. Thus, the soft output also implies the confidence level of the decision. Moreover, the soft output can have more flexible applications. For example, if the highest two scores are close to each other but the highest one corresponds to a rarely deployed modem, the modem with the second highest score may nevertheless be selected as the final choice. Such decision based on maximum likelihood can be used only if side information, such as the number deployed modems for each modem type, is available.

None of the candidate modems may be selected or recommended in some situations. As will be appreciated by those skilled in the art, no modem type is likely to be chosen if the exclusionary features do not match any candidate modem type. Also, when all the modems receive scores below a threshold or minimum score level, no modem type typically is selected. In such case, however, the list of modems that can be confidently excluded can be provided.

As far as the 6 modems in the above detailed example are concerned, the 2Wire 1800HW modem usually can be identified with a relatively high degree of confidence because it is the only modem in the set of modems under consideration that does not use a pilot tone. The 3 modems that use a pilot tone at tone 64 (Efficient 5100a, Efficient 5100b and 2Wire 1000SW) also can be distinguished from one another confidently in most cases. This is because the Efficient 5100b is the only modem among these three that implements power back-off and because the 2Wire 1000SW has several features that are unique to the six modems considered here. However, the remaining two modems, the Efficient 5360 and Alcatel SpeedTouch, can often have close scores because the only feature differentiating these two modems is the downstream transmit power under normal profiles, which is a less reliable feature.

Figure 6:
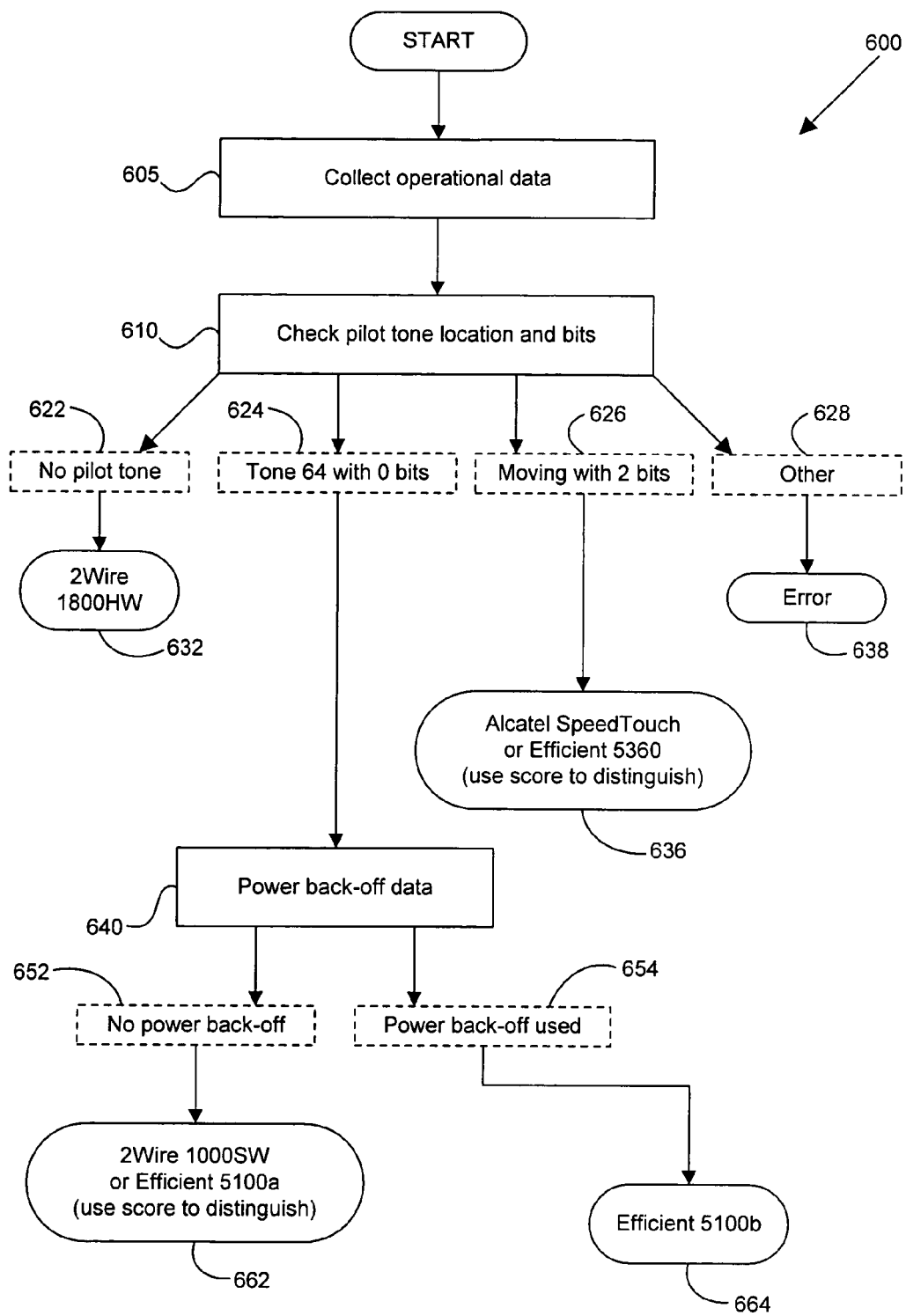
FIG. 6 is a flow diagram of a method according to one or more embodiments of the present invention.

Another method according to one embodiment of the present invention and using some of the information provided and discussed in the foregoing specific example is shown in FIG. 6. Method 600, which operates like a decision tree in some respects, starts and collects operational data at 605. At 610 the operational data is checked to determine the location of and number of bits in the pilot tone. If no pilot tone is used by the modem under consideration at 622, then the 2Wire 1800HW modem can be selected with a reasonable degree of certainty at 632. If tone 64 is the pilot tone and contains 0 bits at 624, then the method moves on to step 640 to evaluate operational data relating to power back-off data. If the operational data shows that the pilot tone contains 2 bits and is moving at 626, then the modem under consideration probably is an Alcatel SpeedTouch or Efficient 5360 at 636. The decision between these two modem types can be made based on aggregate scoring of other features that may assist in determining which modem type is in use. At 628 all other pilot tone location and bit data generates an error message/decision at 638.

When the power back-off data is considered at 640, two possible outcomes are available. At 652 where no power back-off is used by the modem under consideration, the method can determine that the modem under consideration probably is a 2Wire 1000SW or Efficient 5100a at 662. Again, the decision between these two modem types can be made based on aggregate scoring of other features that assist in determining which modem type is in use. Conversely, at 654 where it is determined that power back-off is used, the method can determine at 664 that the modem type being used is an Efficient 5100b with a reasonable degree of certainty.

Modem identification in the above example should be performed with sensitivity to the following issues. First, several types of crosstalk (e.g. ADSL1 FEXT or HDSL NEXT) or RF noise (for example, AM noise) may appear in channels under consideration. Thus, some features may not be discoverable as readily as they would be in the absence of such noise. For example, with the presence of HDSL NEXT, the noise power spectrum in the low frequency region may increase so the rising edge of the downstream bit distribution could appear smoother than it would otherwise.

Second, some modem types may be loaded with two or more different versions of software. Moreover, though the same model, they may possess different features. Thus, variations within each modem type/model could affect the utility and degree of reliability of some modem features as well. Using embodiments of the present invention may thus include updating information on the modem types under consideration, including noting behaviors resulting from multiple software versions, multiple/different feature indicators, etc.

Finally, the present invention may utilize line profiles to generate the data needed for modem identification. Since the details of various line profiles may be changed and new profiles may be added, the features showed in past profiles may also change when changed/new profiles are applied. An awareness of this situation allows those skilled in the art to make suitable adjustments in the present invention to account for profile variations.

When a new modem type is to be added to the set of candidate modems, the characteristics of the new modem type need to be analyzed. To obtain such information, a modem can be connected to lab test equipment that emulates various loop configurations for various profiles. Operational data can be collected from the lab for each combination of profile and loop configurations, and the characteristics thus examined and associated to the new modem type. This process for modem examination and association can be automated by performing standard tests in the lab and then identifying a distribution for each data field. For instance, if a new modem type never shows transmit power less than 3 dBm, and usually shows 12 dBm from the standard lab tests, then the feature can be automatically extracted and used for identifying the new modem type in the following way: the transmit power feature of the new modem type will be awarded a large score when 12 dBm is observed, and a very low score when less than 3 dBm is observed. In general, the scoring for each feature can be based on the comparison between the observed data and the known/measured distribution of the data field. This general method based on the distribution of each data field can facilitate the automation of new modem type characterization.

If insufficient operational data is available, a modem identification unit or controller may "prompt" or stimulate the system to generate data. For example, the controller can send prompting signals to provide a control signal or data set, then collect any operational data relating to the modem on that line to assist in identifying the modem type.

During these processes, each potential modem type's likelihood can be evaluated. Again, the likelihood of a selection's accuracy can be based on various indicators and features of modem performance, such as:

Observed operational data (generated by users' "normal" use of the system) that shows operating performance based on normal operation performance and/or signals; and/or Test data (generated by testing normally conducted on the system) that shows operating performance and/or signals; and/or Prompted operational data (generated by stimulating the communication system) that shows operating performance and/or signals based on stimulation signals or controlled operation parameters.

Modem type selections/decisions can be updated and revised continuously/periodically, depending on the data collected and evaluated (or may be updated on a non-periodic and/or prompted basis). The processes and methods of the present invention can be applied and/or used iteratively, allowing for confirmation and/or updating of modem identification information by a controller such as a DSM Center.

Generally, embodiments of the present invention employ various processes involving data stored in or transferred through one or more computer systems. Embodiments of the present invention also relate to a hardware device or other apparatus for performing these operations. This apparatus may be specially constructed for the required purposes, or it may be a general-purpose computer selectively activated or reconfigured by a computer program and/or data structure stored in the computer. The processes presented herein are not inherently related to any particular computer or other apparatus. In particular, various general-purpose machines may be used with programs written in accordance with the teachings herein, or it may be more convenient to construct a more specialized apparatus to perform the required method steps. A particular structure for a variety of these machines will be apparent to those of ordinary skill in the art based on the description given below.

Embodiments of the present invention as described above employ various process steps involving data stored in computer systems. These steps are those requiring physical manipulation of physical quantities. Usually, though not necessarily, these quantities take the form of electrical or magnetic signals capable of being stored, transferred, combined, compared and otherwise manipulated. It is sometimes convenient, principally for reasons of common usage, to refer to these signals as bits, bitstreams, data signals, control signals, values, elements, variables, characters, data structures or the like. It should be remembered, however, that all of these and similar terms are to be associated with the appropriate physical quantities and are merely convenient labels applied to these quantities.

Further, the manipulations performed are often referred to in terms such as identifying, fitting or comparing. In any of the operations described herein that form part of the present invention these operations are machine operations. Useful machines for performing the operations of embodiments of the present invention include general purpose digital computers or other similar devices. In all cases, there should be borne in mind the distinction between the method of operations in operating a computer and the method of computation itself. Embodiments of the present invention relate to method steps for operating a computer in processing electrical or other physical signals to generate other desired physical signals.

Embodiments of the present invention also relate to an apparatus for performing these operations. This apparatus may be specially constructed for the required purposes, or it may be a general purpose computer selectively activated or reconfigured by a computer program stored in the computer. The processes presented herein are not inherently related to any particular computer or other apparatus. In particular, various general purpose machines may be used with programs written in accordance with the teachings herein, or it may be more convenient to construct a more specialized apparatus to perform the required method steps. The required structure for a variety of these machines will appear from the description given above.

In addition, embodiments of the present invention further relate to computer readable media that include program instructions for performing various computer-implemented operations. The media and program instructions may be those specially designed and constructed for the purposes of the present invention, or they may be of the kind well known and available to those having skill in the computer software arts. Examples of computer-readable media include, but are not limited to, magnetic media such as hard disks, floppy disks, and magnetic tape; optical media such as CD-ROM disks; magneto-optical media such as floptical disks; and hardware devices that are specially configured to store and perform program instructions, such as read-only memory devices (ROM) and random access memory (RAM). Examples of program instructions include both machine code, such as produced by a compiler, and files containing higher level code that may be executed by the computer using an interpreter.

Figure 7:
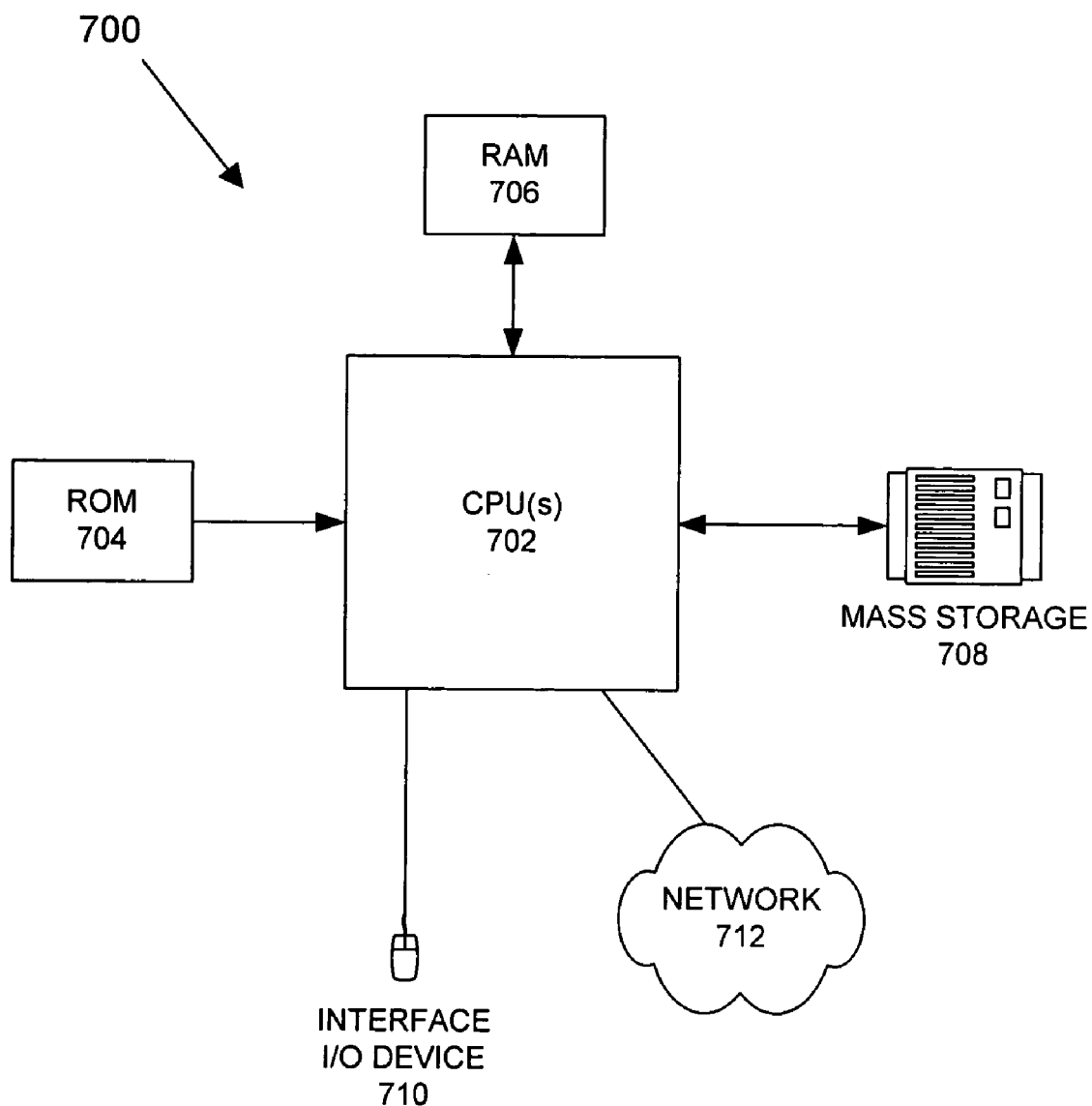
FIG. 7 is a block diagram of a typical computer system suitable for implementing embodiments of the present invention.

FIG. 7 illustrates a typical computer system that can be used by a user and/or controller in accordance with one or more embodiments of the present invention. The computer system 700 includes any number of processors 702 (also referred to as central processing units, or CPUs) that are coupled to storage devices including primary storage 706 (typically a random access memory, or RAM), primary storage 704 (typically a read only memory, or ROM). As is well known in the art, primary storage 704 acts to transfer data and instructions uni-directionally to the CPU and primary storage 706 is used typically to transfer data and instructions in a bi-directional manner. Both of these primary storage devices may include any suitable of the computer-readable media described above. A mass storage device 708 also is coupled bi-directionally to CPU 702 and provides additional data storage capacity and may include any of the computer-readable media described above. The mass storage device 708 may be used to store programs, data and the like and is typically a secondary storage medium such as a hard disk that is slower than primary storage. It will be appreciated that the information retained within the mass storage device 708, may, in appropriate cases, be incorporated in standard fashion as part of primary storage 706 as virtual memory. A specific mass storage device such as a CD-ROM 714 may also pass data uni-directionally to the CPU.

CPU 702 also is coupled to an interface 710 that includes one or more input/output devices such as such as video monitors, track balls, mice, keyboards, microphones, touch-sensitive displays, transducer card readers, magnetic or paper tape readers, tablets, styluses, voice or handwriting recognizers, or other well-known input devices such as, of course, other computers. Finally, CPU 702 optionally may be coupled to a computer or telecommunications network using a network connection as shown generally at 712. With such a network connection, it is contemplated that the CPU might receive information from the network, or might output information to the network in the course of performing the above-described method steps. The above-described devices and materials will be familiar to those of skill in the computer hardware and software arts. The hardware elements described above may define multiple software modules for performing the operations of this invention. For example, instructions for running a codeword composition controller may be stored on mass storage device 708 or 714 and executed on CPU 702 in conjunction with primary memory 706. In a preferred embodiment, the controller is divided into software submodules.

The many features and advantages of the present invention are apparent from the written description, and thus, the appended claims are intended to cover all such features and advantages of the invention. Further, since numerous modifications and changes will readily occur to those skilled in the art, the present invention is not limited to the exact construction and operation as illustrated and described. Therefore, the described embodiments should be taken as illustrative and not restrictive, and the invention should not be limited to the details given herein but should be defined by the following claims and their full scope of equivalents, whether foreseeable or unforeseeable now or in the future.

What is claimed is:

1. A method of identifying a type of Digital Subscriber Line ("DSL") modem operating at a first end of a DSL system, wherein the DSL system comprises the first end DSL modem coupled to a second end DSL modem by a DSL line, the method comprising:
    collecting operational data comprising at least one of performance-characterizing data available from a DSL system element management protocol, management level data from the DSL system, data collected from a DSL network management system, data collected from a DSL management entity, and data collected from a DSL management information base;
    creating a list of candidate DSL modem types;
    comparing one or more characteristics of the collected operational data to operational data characteristics of known DSL modem types to exclude one or more unavailable DSL modem types from the list of candidate DSL modem types;
    comparing one or more characteristics of the collected operational data to the operational data characteristics of known DSL modem types to assign scores to available DSL modem types remaining on the list of candidate DSL modem types; and
    identifying the first end DSL modem type by selecting the available DSL modem type from the remaining list of candidate DSL modem types that has the highest score.

2. The method of claim 1 wherein the operational data comprises data reflecting features of the DSL modem type.

3. The method of claim 1 implemented by a controller.

4. The method of claim 1 further comprising:
    generating control signals for the DSL system based on the identified DSL modem type.

5. The method of claim 1 wherein the operational data comprises exclusionary data, indicative data, or both, the exclusionary data comprising describing an assured characteristic, the indicative data describing a likely characteristic; wherein the method further comprises:
    removing from the list of candidate DSL modem types each candidate DSL modem type known to not exhibit the assured characteristic; and
    improving the score of each candidate DSL modem type within the list of candidate DSL modem types known to exhibit the likely characteristic.

6. The method of claim 5 wherein the exclusionary data is selected from the group comprising: pilot tone location data; data about reported number of bits in the pilot tone; medium-delay interleaved profiles operation data; and power back-off data.

7. The method of claim 5 wherein the indicative data is selected from the group of features comprising: downstream attenuation stability; upstream attenuation stability; upstream transmit power compared to the number of used tones in upstream transmissions; downstream transmit power compared to the number of used tones in downstream transmissions; sharpness of upstream bit distribution rising and falling edges; sharpness of downstream bit distribution rising and falling edges; downstream attenuation with respect to upstream attenuation; a maximum number of bits loaded per tone; abnormal margin values; differences between a current data rate and a maximum attainable data rate for upstream transmissions; and differences between a current data rate and a maximum attainable data rate for downstream transmissions.

8. A method for determining a type of a Digital Subscriber Line ("DSL") modem, the method comprising:
    collecting operational characteristics associated with the DSL modem;
    comparing at least one of the operational characteristics with known operational characteristics corresponding to a list of possible DSL modem types;
    assigning a score to each possible modem type based on the comparison of the at least one operational characteristic and the known operational characteristics; and
    determining the type of the DSL modem by selecting the DSL modem type with the highest score from the list of possible DSL modem types.

9. The method of claim 8 wherein the operational characteristics include one or more of performance data from a DSL management protocol, management data from a DSL system, configuration data from a DSL network management system, fault data from the DSL network management system, and information from a DSL Management Information Base ("MIB").

10. The method of claim 8 further comprising:
    creating the list of possible DSL modem types and correlating the list with the known operational parameters for each possible DSL modem type contained within the list.

11. The method of claim 8 wherein each operational characteristic comprises an exclusionary attribute describing an assured characteristic for one or more of the possible DSL modem types, or an indicative attribute describing a likely characteristic for the one or more of the possible DSL modem types, the method further comprising:

removing from the list of possible DSL modem types each possible DSL modem type known to not exhibit the assured characteristic; and improving the score of each possible DSL modem type within the list of possible DSL modem types known to exhibit the likely characteristic.

12. The method of claim 9 wherein the exclusionary attribute is selected from the group comprising: pilot tone location; pilot tone bit count; medium-delay profile, and power back-off attribute; and wherein the indicative attribute is selected from the group comprising: downstream attenuation stability; upstream attenuation stability; ratio of upstream transmit power to number of used tones in upstream transmissions; ratio of downstream transmit power to used tones in downstream transmissions; sharpness of upstream bit distribution rising and falling edges; sharpness of downstream bit distribution rising and falling edges; ratio of downstream attenuation to upstream attenuation; a maximum number of bits loaded per tone; abnormal margin values; differences between a current data rate and a maximum attainable data rate for upstream transmissions; and differences between the current data rate and a maximum attainable data rate for downstream transmissions.

13. The method of claim 8 further comprising:
generating control signals for the DSL modem based on the selected DSL modem type.

14. The method of claim 8 further comprising:
collecting updated operational characteristics associated with the DSL modem on an ongoing basis; and
re-determining the type of the DSL modem by selecting the DSL modem type with an updated highest score, the updated highest score based on an updated comparison of the updated operational characteristics with the known operational characteristics.

15. The method of claim 8 wherein the known operational characteristics are stored in a database.

16. The method of claim 8 wherein the operational characteristics are selected from the group comprising: upstream bit distribution; downstream bit distribution; upstream transmit power; downstream transmit power; upstream Signal-to-Noise Ratio ("SNR") margin; downstream SNR margin; present upstream data rate; present downstream data rate; upstream maximum attainable data rate; downstream maximum attainable data rate; upstream relative capacity; downstream relative capacity; upstream attenuation; downstream attenuation; upstream ATM cell count; downstream ATM cell count; profile information; upstream Code Violation ("CV") count; downstream CV count; upstream Forward Error Correction ("FEC") count; downstream FEC count; Loss Of Signal ("LOS") count; upstream Errored Seconds ("ES"); downstream ES; upstream Severely Errored Seconds ("SES"); and downstream SES.

17. The method of claim 8 wherein the operational characteristics are collected directly or indirectly from a second DSL modem communicatively connected with the first DSL modem.

18. A computing device communicatively connected with a Digital Subscriber Line ("DSL") modem, the computing device comprising a machine-readable medium having instructions stored thereon that, when executed by a processor, cause the processor to perform operations comprising:

collecting operational characteristics associated with the DSL modem;

comparing at least one of the operational characteristics with known operational characteristics corresponding to a list of possible DSL modem types;

assigning a score to each possible modem type based on the comparison of the at least one operational characteristic with the known operational characteristics; and determining the type of the DSL modem by selecting the DSL modem type with the highest score from the list of possible DSL modem types.

19. The computing device of claim 18 wherein each operational characteristic comprises an exclusionary attribute describing an assured characteristic for one or more of the possible DSL modem types, or an indicative attribute describing a likely characteristic for the one or more of the possible DSL modem types, the method further comprising:

removing from the list of possible DSL modem types each possible DSL modem type known to not exhibit the assured characteristic; and improving the score of each possible DSL modem type within the list of possible DSL modem types known to exhibit the likely characteristic.

20. The computing device of claim 18 wherein the computing device further comprises a DSL system controller.

21. The computing device of claim 18 wherein the instructions cause the processor to perform further operations comprising:

generating control signals for the DSL modem based on the selected DSL modem type.

22. A Digital Subscriber Line ("DSL") system comprising:

a first DSL modem to connect with a second DSL modem via a DSL line; and a controller communicatively connected with the first DSL modem, the controller comprising:

means for collecting operational characteristics associated with the second DSL modem, means for comparing at least one of the operational characteristics with known operational characteristics corresponding to a list of possible DSL modem types, means for assigning a score to each possible modem type based on the comparison of the at least one operational characteristic and the known operational characteristics, and means for determining the type of the second DSL modem by selecting the DSL modem type with the highest score from the list of possible DSL modem types.

23. The DSL system of claim 22 further comprising:
means for creating the list of possible DSL modem types and correlating the list with the known operational parameters for each possible DSL modem type contained within the list; and means for storing the list of possible DSL modem types, wherein the list is accessible to the controller.

24. The DSL system of claim 22 wherein each operational characteristic comprises an exclusionary attribute describing an assured characteristic for one or more of the possible DSL modem types, or an indicative attribute describing a likely characteristic for the one or more possible DSL modem types, the method further comprising:

removing from the list of possible DSL modem types each possible DSL modem type known to not exhibit the assured characteristic; and improving the score of each possible DSL modem type within the list of possible DSL modem types known to exhibit the likely characteristic.

25. The DSL system of claim 22 further comprising:
means for generating control signals for the second DSL modem based on the selected DSL modem type.

26. The DSL system of claim 22 wherein collecting operational characteristics associated with the second DSL modem comprises receiving the operational characteristics from the first DSL modem.

* * * * *